United States Patent Office 3,236,909
Patented Feb. 22, 1966

3,236,909
ISOMERIZATION OF OLEFINS
Charles N. Winnick, Teaneck, N.J., assignor to Halcon International Inc., a corporation of Delaware
No Drawing. Filed Jan. 17, 1963, Ser. No. 252,048
9 Claims. (Cl. 260—683.2)

This application is a continuation-in-part of my application Serial No. 764,759, filed October 2, 1958, and now abandoned.

This invention is concerned with processes and catalysts for the isomerization of olefins. More specifically, this invention is concerned with processes and catalysts for the isomerization of mono-olefins containing a tertiary unsaturated carbon atom.

It is known in the art to isomerize mono-olefins with a variety of catalysts. Commonly employed are strongly acidic catalysts such as sulfuric acid, phosphoric acid, aluminum chloride, etc., either in solution or on a solid adsorbent.

Unfortunately, the strong acids cause considerable polymerization of olefins containing a tertiary unsaturated carbon atom, therefore reducing the yield of desired materials. In addition, these catalysts often bring about chain rearrangement, reducing the yield of desired isomers.

Isomerization catalysts known to the art which are not strong acids, e.g. activated alumina, require high temperatures, usually over 200° C. and result in lower yields of desired isomers.

It is a feature of the present invention to utilize catalysts having an acid strength in a range such that polymer formation is avoided.

Another feature of the invention is a method of mono-olefin isomerization in which chain rearrangement is avoided.

It is another feature of the present invention to accomplish isomerization of mono-olefin compounds having unsaturated tertiary carbon atoms in the liquid phase and at lower temperatures as compared to heretofore known processes.

It is a further feature of the present invention to provide non-aqueous solid catalysts which effect the isomerization of said mono-olefins.

It is another feature of the present invention to produce mono-olefin isomers by contacting a mono-olefin containing a tertiary unsaturated carbon atom in the liquid phase with a base treated zeolite isomerization catalyst.

It is another feature of the invention to provide an isomerization catalyst by contacting a silica-alumina catalyst with a basic aqueous solution, washing said catalyst free of unreacted base, contacting said catalyst with a buffered acidic solution having a pH in the range of 2.5 to 6, washing said catalyst free of unreacted acid and drying said catalyst by passing dry nitrogen over the catalyst at a temperature of approximately 100° C. until the outlet gases are dry.

The isomerization of mono-olefins is of particular value where selective formation of an isomer which can be utilized as an intermediate in the preparation of a desired product, is favored.

In many processes a feed stream containing a mixture of hydrocarbons is introduced into a reaction system in order that a component of the stream, which may be present in relatively small amounts, be reacted to form a desired product. In such processes, high costs of separation are encountered in order to separate the other components of the feed stream. Alternatively, the entire feed stream is reacted, and costly separation of by-products, which are formed with the desired product, is required.

Where the component to be reacted is present in small quantities in a given feed stream, it is necessary to supply a great amount of feed to the reaction system so that a sufficient quantity of the desired component may be reacted.

It is a feature of the present invention, in processes where feed streams comprise mono-olefins containing unsaturated tertiary carbon atoms, to enrich the desired isomer content of said feed stream by contacting said mono-olefins with a base treated zeolite catalyst. This results in more economical processes and higher yields per unit of feed since the isomer content is increased and separation and purification problems are minimized.

As used herein, the term "zeolite" is used to embrace both the natural and synthetic acidic materials, particularly clays, exhibiting ion exchange characteristics.

The invention is illustrated by, but not restricted to, the following preferred embodiments.

Example 1

Silica-alumina zeolite catalyst granules are treated with a 10% sodium carbonate solution and thoroughly washed with water until the washings are neutral. The catalyst is then treated with an acetic acid sodium-acetate buffer having a pH of 4.6, washed until the washings are neutral and then dried by passing dry nitrogen over the catalyst at a temperature of approximately 100° C.

The resulting catalyst is charged to a reactor and contacted with an equal volume of 2-methyl-pentene-1 at a temperature of 60° C. for approximately 20 minutes. There is obtained an equilibrium mixture of approximately 85 parts of 2-methyl-pentene-2 and 15 parts of 2-methyl-pentene-1. About 3% of polymeric material is formed.

Example 2

A silica-alumina zeolite catalyst is treated in the manner described in Example 1 except that the neutralization step (the sodium carbonate treatment) is omitted. 2-methyl-pentene-1 is contacted with this non-neutralized catalyst for approximately 20 minutes at a temperature of 60° C. The resulting product contains a substantial amount of polymeric material, approximately 55%.

Comparison of Examples 1 and 2 demonstrates that the step of neutralizing the zeolite catalyst with a base, such as sodium carbonate prior to the acid wash treatment minimizes the formation of polymeric materials during the isomerization process.

Example 3

A silica-alumina zeolite catalyst is dried at 100° C. for 3 hours. 2-methyl-pentene-1 is contacted with this catalyst for the below indicated times and temperatures. There are obtained the below indicated mixtures of $C_6$ olefins and amounts of polymeric material.

| Time (min.) | Temperature (° C.) | 2-methyl-pentene-2 to 2-methyl-pentene-1 ratio | Weight percent polymer |
|---|---|---|---|
| 2 | 60 | 82/18 | 41 |
| 5 | 19 | 32/68 | 14 |

Example 3 demonstrates that substantial polymeric formation occurs when an untreated silica-alumina zeolite catalyst is employed, even when the isomerization is carried out using short contact time.

Example 4

The procedure of Example 1 is repeated except that catalysts are prepared by treatment with acetic acid sodium-acetate buffers having the below indicated pH values. 2-methyl-pentene-1 is contacted with these catalysts for the below indicated times at approximately 60°

C. and there are obtained C$_6$ olefins having the below indicated composition. The below indicated amounts of polymer are obtained.

| pH | Time (min.) | 2-methyl-pentene-2 to 2-methyl-pentene-1 ratio | Weight percent polymer |
|---|---|---|---|
| 4.1 | 5 | 63/37 | 5.0 |
| 4.1 | 10 | 79/21 | 7.5 |
| 4.9 | 5 | 43/57 | 2.0 |
| 4.9 | 10 | 62/38 | 2.5 |
| 4.9 | 20 | 78/22 | 3.0 |

Example 4 demonstrates that polymer formation may be minimized when the base treatment is carried out over a desired pH range of about 4 to 5.

The foregoing examples illustrate, inter alia, the catalytic isomerization of 2-methyl-pentene-1 to 2-methyl-pentene-2 with minimal polymerization utilizing as a catalyst a zeolite, particularly a base-modified synthetic zeolite catalyst. This isomerization is carried out continuously by passing 2-methyl-pentene-1 over a catalyst bed at an hourly space velocity of 3 at a temperature of about 60° C. and at substantially atmospheric pressure to yield an aquilibrium mixture of 2-methyl-pentene-2 and 2-methyl-pentene-1, as described above. The space velocity can be in the broad range of 1 to 10 and desirably is in the range of about 2 to about 4. The temperature of the 2-methyl-pentene-1 entering the catalyst bed is in the broad range of from about 35° C. to the boiling point of the organic phase at the particular pressure utilized. Desirable results are obtained in the temperature range of from about 45 to 70° C. utilizing, as necessary, moderate pressures on the system.

Example 5

Approximately six parts by weight of 2,3-dimethyl-butene-2 are mixed with one part of the treated silica-alumina catalyst of Example 1. The mixture is refluxed under an efficient fractionating column. 2,3-dimethyl-butene-1, which boils at 55.5 to 56.5° C., is slowly distilled off. A 95% yield of this isomer is obtained. Substantially no polymeric material is formed.

Example 6

Approximately six parts by weight of 2-methyl-butene-1 are refluxed in a pressurized Soxhlet apparatus over one part of the treated silica-alumina catalyst of Example 1. The pressure in the system is maintained at a point such that the liquid boils at 70° C. After eight hours, 96% of mixed methyl-butenes are recovered, consisting of 81% 2-methyl-butene-2 and 19% 2-methyl-butene-1. Substantially no polymeric material is formed.

Example 7

Approximately nine parts by weight of a mixture of hydrocarbons containing 70% 2-ethyl-butene-1, 20% 3-methyl-pentene-2 and 10% of other olefins, mainly n-hexene, are refluxed in a Soxhlet extractor containing one part of the treated silica-alumina catalyst of Example 1, for eighteen hours. The resultant product contains 84% 3-methyl-pentene-2 and 5% 2-ethyl-butene-1. Substantially no polymeric material is formed.

From the foregoing it will be observed that the present invention provides a means of attaining equilibrium mixtures of olefins. This enables conversion of non-equilibrium mixtures of olefins with the resultant change in the ratios of particular isomers. Starting with equilibrium mixtures, by removal of a particular desired isomer and use of the present invention to re-attain equilibrium conditions, the overall yield of the particular isomer desired is enhanced.

It is intended in the present invention that the catalysts be utilized to produce either products or reactants from each other since the reactions are reversible.

It should be realized that a catalyst treated with a buffer of lower pH is more active and, consequently, during the isomerization there will be a greater amount of polymeric materials formed. Therefore, by lowering the pH of the buffered solution with which the catalyst is treated, the rate of reaction is increased but the amount of polymeric material formed is also increased.

Isomerization of mono-olefins containing from 5 to 14 carbon atoms is particularly desirable in order to produce isomers which can be cracked to yield valuable products, but it is intended that the present invention embrace all processes in which isomers may be formed from mono-olefins containing unsaturated tertiary carbon atoms.

Although utilization of sodium carbonate is noted in the foregoing examples, it is intended that any base, such as sodium hydroxide which will neutralize the catalyst, can be employed. The alkali metal and ammonium hydroxides and carbonates are preferred for use in the neutralization of the acidic zeolite. However, other neutralizing agents can be employed. The concentration of the base in solution can be broadly 2 to 20%, preferably 5 to 15% and desirably 10% by weight.

Acetic acid is set forth as the acid media in the buffering step, but it is intended that any buffered acidic solution having a pH broadly in the range of 2.5 to 6.0, preferably 3.5 to 5.5 and desirably 4 to 5, may be employed.

The use of nitrogen is set forth in the previous examples to dry the catalyst, but it is intended that any suitable drying process be employed, preferably drying with an inert gas stream at 60 to 150° C., desirably utilizing nitrogen at 100° C.

It is particularly to be noted that a feature of the present invention resides in the discovery that the above described catalysts make possible the isomerization of olefins particularly mono-olefins containing an unsaturated tertiary carbon atom in the liquid phase and at temperatures in the range of from about 30° C. to the boiling point of the organic phase at the particular pressure utilized, but it should be realized that when the olefins are high boiling materials the temperature is preferably kept below 100° C. to avoid formation of undesired by-products. Desirable results are obtained in the temperature range of from about 40° C. to 80° C.

In view of the foregoing disclosures, variations and modifications thereof will be apparent to one skilled in the art, and it is intended to include within the invention all such variations and modifications except as do not come within the scope of the appended claims.

What is claimed is:

1. A process for the isomerization of mono-olefins, comprising contacting a mono-olefin containing a tertiary unsaturated carbon atom in the liquid phase with a catalyst comprising an acidic zeolite which has been neutralized and contacted with a buffered acidic solution having a pH in the range of 2.5 to 6.

2. The process of claim 1, wherein said mono-olefin contains from 5 to 14 carbon atoms.

3. The process of claim 1, wherein said mono-olefin comprises 2-methyl-pentene-1 and there is produced 2-methyl-pentene-2.

4. The process of claim 1, wherein said mono-olefin comprises 2,3-dimethyl-butene-2 and there is produced 2,3-dimethyl-butene-1.

5. The process of claim 1, wherein said mono-olefin comprises 2-methyl-butene-1 and there is produced 2-methyl-butene-2.

6. The process of claim 1, wherein said mono-olefin comprises 2-ethyl-butene-1 and there is produced 3-methyl-pentene-2.

7. A process for the isomerization of mono-olefins, comprising contacting a mono-olefin containing a tertiary unsaturated carbon atom in the liquid phase at a temperature in the range of from about 30° C. to 100° C. with a catalyst obtained by contacting an acidic silica alumina zeolite with a basic aqueous solution, washing the contacted silica-alumina zeolite until the washings are neutral, contacting the washed silica-alumina zeolite with a buffered acidic solution having a pH in the range of 2.5 to 6, washing the thus contacted silica-alumina zeolite until the washings are neutral and drying the resulting catalyst.

8. A process of claim 7 wherein silica-alumina zeolite is neutralized by treatment with a solution of a basic material selected from the group consisting of alkali metal and ammonium hydroxide and carbonate.

9. A catalyst useful for the isomerization of monoolefins containing an unsaturated tertiary carbon atom, said catalyst having been prepared by neutralizing an acidic silica-alumina zeolite with a basic aqueous solution washing the neutralized product until the washings are neutral, contacting the wash material with a buffered acidic solution having a pH in the range of 2.5 to 6, washing the buffered material until the washings are neutral, and drying the resulting catalyst.

References Cited by the Examiner
UNITED STATES PATENTS

| | | | |
|---|---|---|---|
| 1,728,732 | 9/1929 | Jaeger | 260—671 |
| 2,217,252 | 10/1940 | Hoog | 252—455 |
| 2,882,244 | 4/1959 | Milton | 260—676 |
| 3,104,269 | 9/1963 | Schaffel | 260—683.2 |

ALPHONSO D. SULLIVAN, *Primary Examiner.*

PAUL M. COUGHLAN, *Examiner.*